United States Patent
Bates et al.

(10) Patent No.: US 7,890,936 B2
(45) Date of Patent: Feb. 15, 2011

(54) METHOD OF REVERSE READ CODE TO LOCATE USEFUL INFORMATION

(75) Inventors: Cary L. Bates, Rochester, MN (US); Jason J. Illg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/461,034

(22) Filed: Jul. 31, 2006

(65) Prior Publication Data

US 2008/0028367 A1    Jan. 31, 2008

(51) Int. Cl.
*G06F 9/44* (2006.01)

(52) U.S. Cl. .................. 717/130; 717/131; 717/140; 717/141

(58) Field of Classification Search ............ None
See application file for complete search history.

(56) References Cited

U.S. PATENT DOCUMENTS

2004/0225997 A1* 11/2004 Van De Vanter et al. .... 717/109

* cited by examiner

*Primary Examiner*—Chuck O Kendall
(74) *Attorney, Agent, or Firm*—Cantor Colburn LLP

(57) ABSTRACT

A method for reverse reading a computer program code to locate useful information includes receiving a selection of a line of the computer program code from a user, extracting one or more variables from the line of the computer program, searching the computer program code for one or more other lines of code that create and/or use the variables, and highlighting the other lines of code that create and/or use the variables.

2 Claims, 2 Drawing Sheets

METHOD OF REVERSE READ CODE TO LOCATE USEFUL INFORMATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates generally to maintaining computer program code and particularly to a method of reverse reading computer program code to locate useful information.

2. Description of Background

In the process of maintaining old code, a programmer often comes across a piece of code that performs a desired function, but the code is not written in a way such that the function is clearly exposed. In this case, the programmer may end up copying part of the code from the source, but it is often difficult to determine what additional lines of code the desired function depends on.

By way of example, it is assumed that a first programmer wrote code that a second programmer wanted to copy because the first programmer's code performed the same function that the second programmer needed to code. It is also assumed that the first programmer is, for example, inexperienced and/ or lacks sophisticated programming skills, and simply points the second programmer to a method that contained several functions, including the function that the second programmer desires to copy. In this scenario, the second programmer would have to parse through the entire source of such code in order to determine which portion(s) thereof is relevant to the desired function so as to further identify the specific portion (s) of code to be copied.

Such a scenario is increasingly likely upon consideration that, as older programmers continue to retire, they are replaced by younger programmers who may be unable to support older code (procedural). In other words, much of the old code does not support object oriented programming, whereas any new student coming out of college is only familiar with object oriented programming. There is thus a risk that as the legacy programmers retire, new programmers will not have the appropriate skills to support this older code.

Often times when being asked to maintain foreign code, programmers may not even need to know how to use the language the old code was written in. Rather, they simply need to look at the code and update it based upon other examples in the code. However, if the code is overly complex, not object oriented, or even very well defined structurally it can be very difficult to maintain without extensive knowledge of how the programming language works. What is needed therefore is a method of reverse read code to locate useful information.

SUMMARY

The shortcomings of the prior art are overcome and additional advantages are provided through a method for reverse reading a computer program code to locate useful information, including receiving a selection of a line of the computer program code from a user, extracting one or more variables from the line of the computer program, searching the computer program code for one or more other lines of code that create or use the variables, and highlighting the other lines of code that create or use the variables.

In another exemplary embodiment, a method for reverse reading a computer program code to locate useful information includes receiving, from a user, a selection of a variable from a line of the computer program, searching the computer program code for one or more other lines of code that create and/or use the selected variable, and highlighting the one or more other lines of code that create and/or use the selected variable.

Exemplary embodiments also include a computer program product for reverse reading a computer program code to locate useful information, the computer program product including: a storage medium readable by a processing circuit and storing instructions for execution by the processing circuit for facilitating a method including: receiving a selection of a line of the computer program code from a user; extracting one or more variables from the line of the computer program; searching the computer program code for one or more other lines of code that create and/or use the variables; highlighting the other lines of code that create and/or use the variables; extracting a secondary variable from the other lines of code that create and/or use the variable; searching the computer program code for one or more other line of code that create and/or use the secondary variable; and highlighting the other lines of code that create and/or use the secondary variable.

Additional features and advantages are realized through the techniques of the present invention. Other embodiments and aspects of the invention are described in detail herein and are considered a part of the claimed invention. For a better understanding of the invention with advantages and features, reference may be made to the description and to the drawings.

TECHNICAL EFFECTS

As a result of the summarized invention, technically we have achieved a solution that provides the ability to determine the lines of code upon which a particular variable value is dependent, and highlighting the same in an editor.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
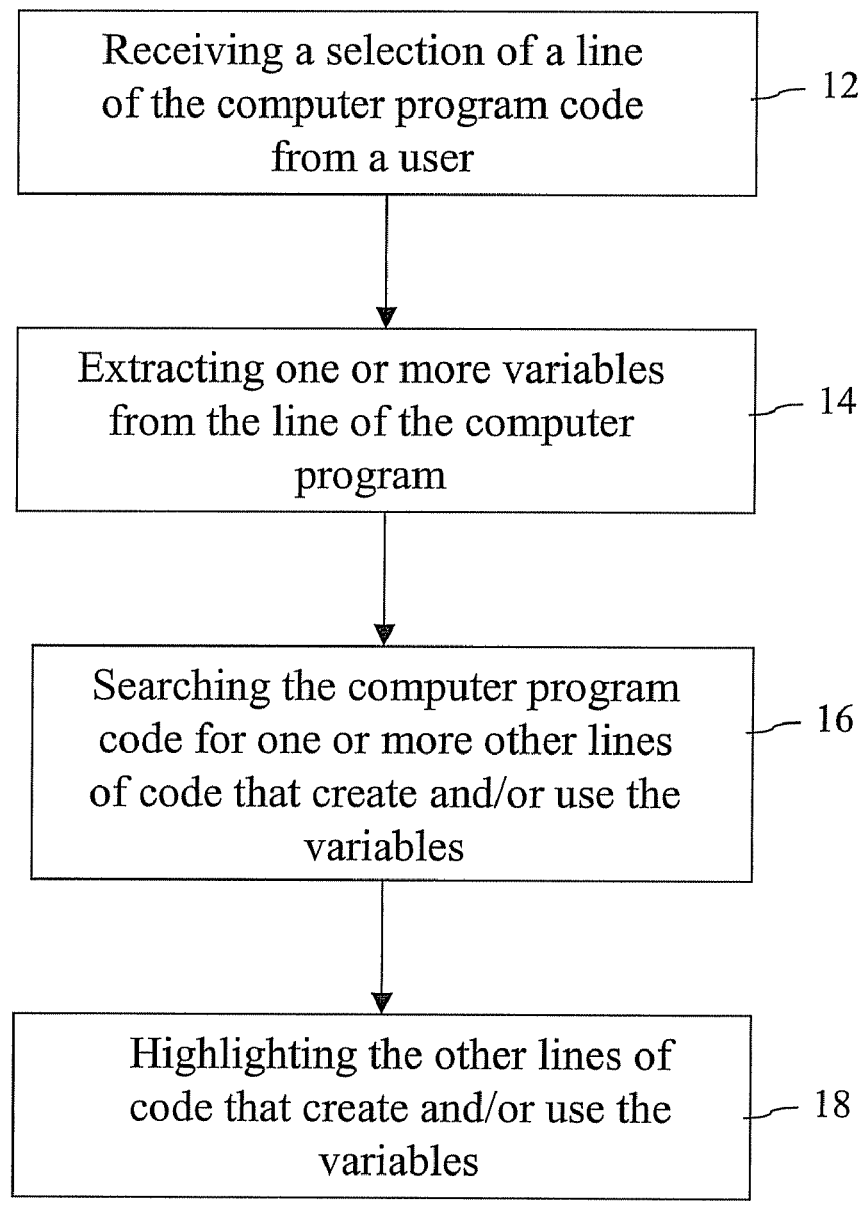
FIG. 1 illustrates a flowchart of a method for reverse read code to locate useful information in accordance with an exemplary embodiment of the invention.

The detailed description explains the preferred embodiments of the invention, together with advantages and features, by way of example with reference to the drawings.

DETAILED DESCRIPTION

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail. The examples used herein are intended merely to facilitate an understanding of ways in which the invention may be practiced and to further enable those of skill in the art to practice the invention. Accordingly, the examples should not be construed as limiting the scope of the invention.

Referring now to FIG. 1, a flowchart of a method for reverse read code to locate useful information in accordance with exemplary embodiments is illustrated generally as 10. The method 10 includes receiving a selection of a line of the computer program code from a user, as shown at process step 12. The method 10 also includes extracting one or more variables from the line of the computer program, as shown at process step 14. After extracting the variables, the method 10, searches the computer program code for one or more other lines of code that create and/or use the variables, as shown at process step 16. Finally, the method 10 concludes at method step 18 by highlighting the other lines of code that create and/or use the variables.

In one embodiment, a method is provided that will highlight the dependent lines based on return value, or any variable, within the source text to enable easier understanding of the computer program code. The method may be especially applicable to legacy procedural code (e.g., code that is not object oriented). When a user selects an expression, or line of code, by highlighted in an editor, the expression is broken down in to definitions or variables. Next, each of the lines of code from which each of the definition or variable were created and/or used is highlighted. The method is then applied recursively to each of these definitions and highlights each of the lines that contain definitions, which contributed to them. The method terminates when all lines with contributing definitions are already highlighted.

In one embodiment, using the example code below:

```
example( )
{
  int a,b,c;
  a = 1;
  b = 2;
  if ( a > 5 )
    {
      b = 3;
      global_var_flag = 1;
    }
  global_var = b;
  return b;
}
``` a user selects "b" at the return statement and invokes the method 10 to see all the lines that are needed to compute b. The first definition to reach "return b" is "b=3" and the next definition which reaches b is "b=2". The method 10 would highlight these lines. Additionally, because "b=3"; is within an "if" block, the "if" block and condition will also be highlighted by the method 10.

Next the method 10 looks at each of the newly highlighted lines and looks for any definitions that are used in those lines. For "b=3"; and "b=2"; there are no definitions that are used since 2 and 3 are literals, but for the if condition "(a>5)" there is at least one definition for 'a' that reaches that point and that is "a=1"; so the method 10 highlights "a=1"; and now recursively visits each of the newly highlighted lines.

In this case, the only newly highlighted line is "a=1"; since 1 is a literal, there are no definitions that are used on this line. The method 10 cannot highlight any more lines and so the method 10 terminates. At this point the lines highlighted are:

```
a = 1;
b = 2;
  if ( a > 5 )
  {
    b = 3;
  }
return b
```

The method 10 has essentially extracted the code that computes the value for b at the selected point in the computer program. Thus, having such a feature in an Integrated Development Environment, or IDE, would greatly help the programmer to better understand the program they are working on. To describe the method 10 in a real life scenario, consider the above code but much larger, more expanded, more complex, and foreign to the developer. Suppose a programmer needed to perform a set of logic related to a database based on a request. If the programmer is not an experienced object oriented programmer, the programmer may have code all in one method, such as:

UpdateName(String httpRequest)

1. Retrieve Name from Request

2. Determine database connectivity by loading database data

3. Create Database Connection

4. Retrieve Name and Compare

5. Throw Exception If Names Same

6. Update database with name.

The above logic would be very nested as well, with many if checks and imbedded exceptions because database connections throw different exceptions, or return false or true based on results of requests.

In one embodiment, it is assumed a programmer needs to access the above code only to determine how to create the database connection, and how to update a record. The programmer could locate the section of the code with the update function and use the method 10 to find only the code necessary to create the database connectivity and perform an update. For this limited purpose, the programmer only needs to see the code associated with steps two, three and six and does not need to see the code associated with steps one, four and five.

Figure 2:
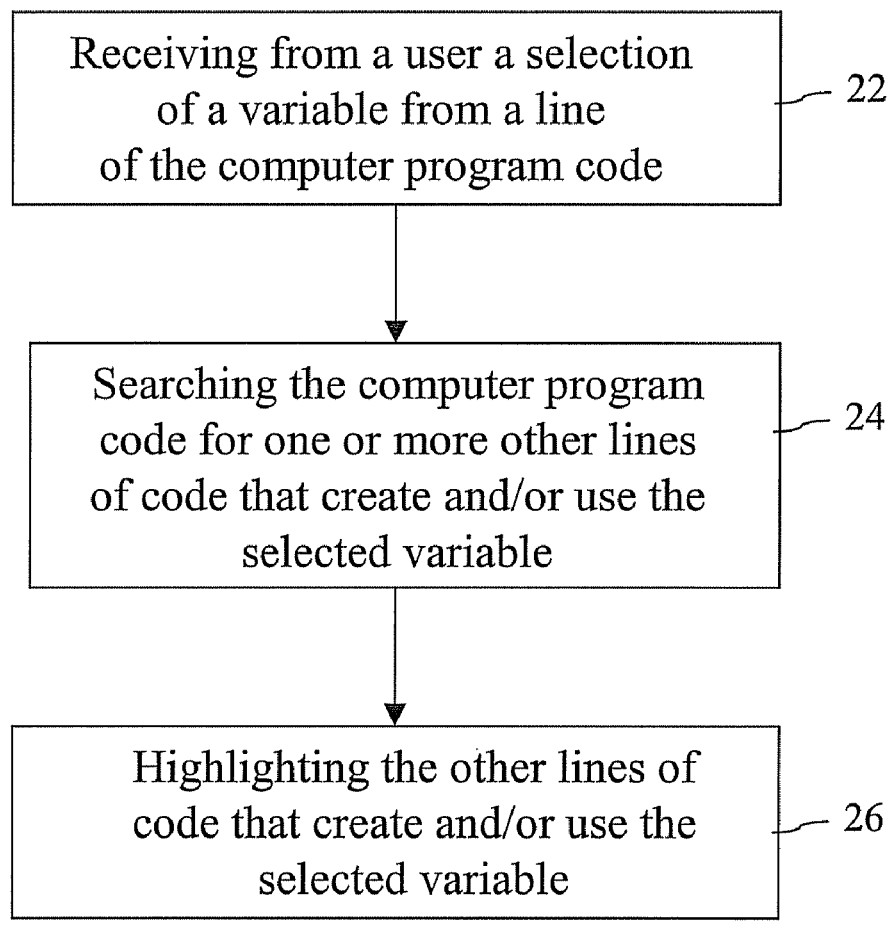
FIG. 2 illustrates a flowchart of a method for reverse read code to locate useful information in accordance with an alternative exemplary embodiment of the invention.

Finally, FIG. 2 is a flowchart of a method 20 for reverse read code to locate useful information in accordance with an alternative embodiment of the invention. In lieu of receiving a selection of a line of the computer program code from a user, method 20 begins by receiving, from a user, a single variable from a line of computer code, as shown at process step 22. The method 20 then searches the computer program code for one or more other lines of code that create and/or use the selected variable, as shown at process step 24. Then, the method 20 concludes at method step 26 by highlighting the other lines of code that create and/or use the selected variable.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention.

The article of manufacture can be included as a part of a computer system or sold separately.

Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for reverse reading a computer program code to locate useful information, comprising:

receiving a selection of a line of the computer program code from a user;

extracting one or more variables from the line of the computer program;

searching the computer program code for one or more other lines of code that create or use the variables;

highlighting the one or more other lines of code that create and/or use the variables; and extracting a secondary variable from the other lines of code that create and/or use the variable;

searching the computer program code for one or more other line of code that create and/or use the secondary variable;

highlighting the other lines of code that create or use the secondary variable.

2. The method of claim 1, wherein the method is incorporated in an integrated development environment.

* * * * *